L. Taylor.

Mop Head.

No. 3,215. Reissued Nov. 24, 1868.

Witnesses
Sam'l H Porter
David A Smith

Inventor
Luke Taylor

N. PETERS, PHOTO-LITHOGRAPHER, WASHINGTON, D. C.

UNITED STATES PATENT OFFICE.

LUKE TAYLOR, OF SPRINGFIELD, VERMONT.

IMPROVED MOP-HEAD.

Specification forming part of Letters Patent No. 22,990, dated February 15, 1859; Reissue No. 3,192, dated November 10, 1868; Reissue No. 3,215, dated November 24, 1868.

*To all whom it may concern:*

Be it known that I, LUKE TAYLOR, of Springfield, in the county of Windsor and State of Vermont, have invented a new and Improved Mop-Head; and I do hereby declare that the following is a full, clear, and exact description of the same, reference being had to the annexed drawings, making a part of this specification, in which—

Figure 1:
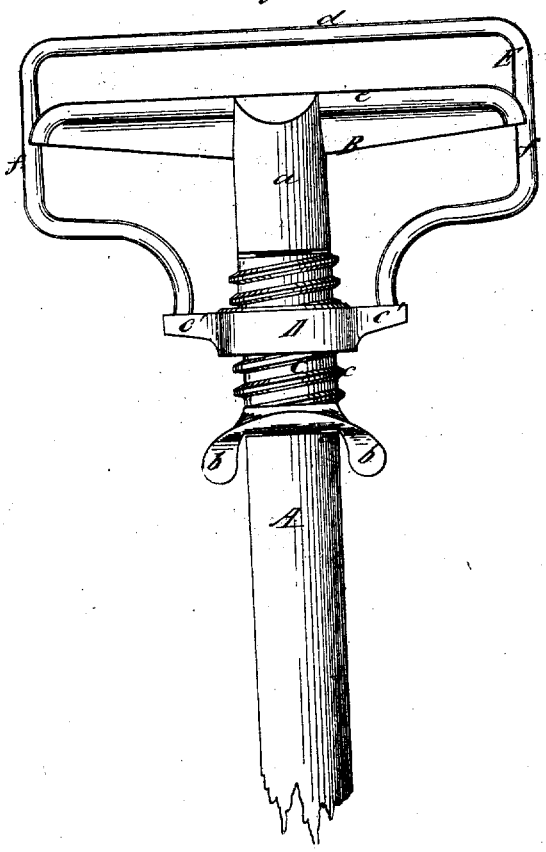
Figure 2:
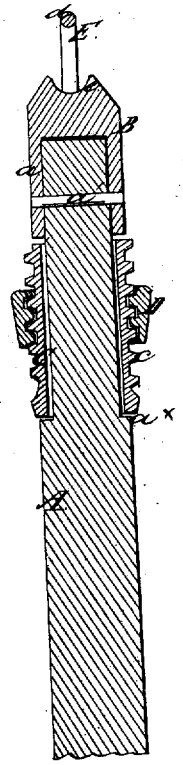

Figure 1 is an external view of my invention. Fig. 2 is a longitudinal section of the same, taken in line *x x*, Fig. 1.

Similar letters of reference indicate corresponding parts in the two figures.

To enable those skilled in the art to fully understand and construct my invention, I will proceed to describe it.

A represents the handle of the mop-head, said handle being constructed of a tough elastic wood, and B represents the stationary jaw of the head, which is of T form, one portion, *a*, being a socket, which is fitted on the end of the handle A, and secured permanently thereto by means of rivets, *a'*, one or more. On the handle A, below the socket *a*, and between said socket and a shoulder, $a^{\times}$, on the handle, a collar, C, is placed, and allowed to turn freely, the lower end of said collar having projections *b* attached, for the purpose of allowing said collar to be readily turned by the hand or thumb and fingers. On this collar there is a screw-thread, *c*, on which a nut, D, works. The nut D is provided with projecting ears *c' c'* at opposite sides of it, and to these ears *c' c'* the ends of a jaw, E, are attached. The jaw E is formed of a curved wrought-iron rod, so bent that a portion, *d*, of it will be parallel with the portion *e* of the stationary jaw B, and the remaining portions, *f f*, so bent that they will pass around the ends of the stationary jaw B, fitting in recesses therein, and serving as guides, and their lower parts curved so as to be attached to the projecting ears *c' c'* of the nut D, as shown clearly in Fig. 1.

The stationary jaw B may be of cast-iron, malleable, if desired, and the collar C, with its screw, *c*, may be of the same material.

From the above description it will be seen that by simply turning the collar C the jaw E will be moved in and out from the stationary jaw B, and the cloth or mop firmly secured in the head or between the two jaws, and also readily released or detached therefrom when necessary.

I am aware that mop-heads have been made with an external screw-thread cut on a handle, and a nut or internal screw cut in the cross-head or yoke of a movable jaw to work on said external screw. These parts, therefore, which constitute the old wooden mop-head, I do not claim, broadly, or in themselves considered; but I do claim as new and desire to secure by Letters Patent—

1. In a mop-head in which the cross-head or stationary jaw is attached permanently and immovably to the handle, operating the movable jaw or binder by means of a tubular screw or socket fitted on the handle, and having its screw-thread on its exterior, in combination with a nut encompassing the screw, and connected with the movable jaw so as to operate substantially in the manner as shown or described.

2. Operating the movable jaw by means of the loose screw-collar C, revolving between the nut D and the handle A, substantially as described.

The above specification of my invention signed by me this 14th day of November, 1868.

LUKE TAYLOR.

Witnesses:

T. W. KENDALL,

SAML. W. PORTER.